A. J. McCOLLUM & G. D. EMERY.
Saw-Swages.
No. 141,572. Patented August 5, 1873.
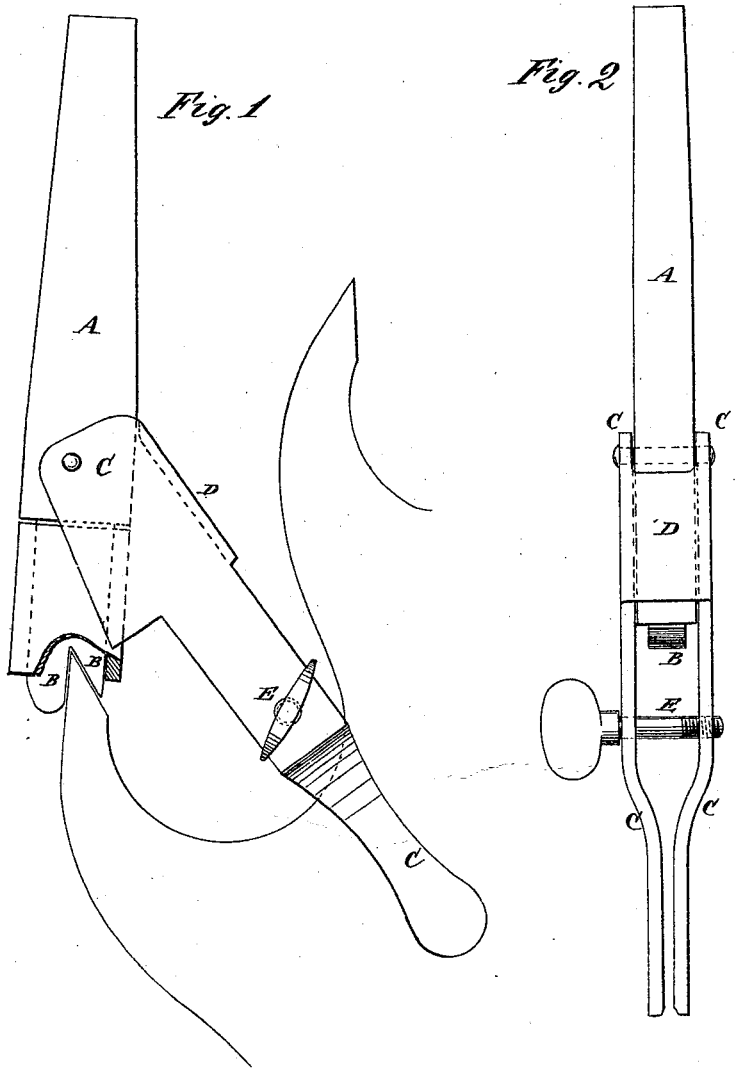

UNITED STATES PATENT OFFICE.

ANDREW J. McCOLLUM AND GEORGE D. EMERY, OF INDIANAPOLIS, IND.

IMPROVEMENT IN SAW-SWAGES.

Specification forming part of Letters Patent No. 141,572, dated August 5, 1873; application filed March 8, 1873.

*To all whom it may concern:*

Be it known that we, ANDREW J. McCOLLUM and GEORGE D. EMERY, of Indianapolis, in the county of Marion and State of Indiana, have invented a new and useful Improvement in Guide Attachment for Saw-Swage, of which the following is a specification:

Figure 1 is a side view of our improved attachment shown as applied to a saw-swage. Fig. 2 is a rear view of the same.

Our invention has for its object to furnish an improved attachment for a saw-swage, by means of which the swage will be held perfectly square across the tooth, so as to make all the cutting-points exactly alike, and thus enable the saw to be filed much more quickly than it could otherwise be done. The invention consists in the guide-arms connected at their upper ends by a back, and pivoted to the stock of the swage, and in the combination of the set-screw with the guide pivoted to the stock of the swage, as hereinafter fully described.

A represents the stock and B the jaws of a saw-swage, about the construction of which there is nothing new. C are the arms of the guide, the upper ends of which are pivoted to the opposite sides of the swage-stock A, a little above the jaws B, as shown in Figs. 1 and 2. The arms C are connected with each other by the back D, formed solid with them. The arms C, a little below the jaws B, are bent inward or toward each other, and their lower ends extend downward parallel with each other, as shown in Fig. 2, and at such a distance apart as to receive the plate of the saw between them. The guide-arms C may be provided with a set-screw, E, which passes through one of said arms C and screws into the other arm, as shown in Figs. 1 and 2, so that the lower ends of the arms C may be adjusted closer together or farther apart, as the thickness of the saw-plate may require. The set-screw E may be used or not, as may be required. In using the guide, it is adjusted upon the swage so that the arms C may point toward the mandrel of the saw, and will thus hold the swage squarely upon the teeth, making their points exactly alike and perfectly square.

By using the swage upon the teeth of a saw partly filed, and then filing the teeth by the marks of the swage, the saw may be filed in less than half the time that would otherwise be required.

Having thus described our invention, we claim as new and desire to secure by Letters Patent—

1. The guide-arms C connected at their upper ends by a back, D, and pivoted to the stock A of the swage A B, substantially as herein shown and described and for the purpose set forth.

2. The combination of the set-screw E with the guide C D pivoted to the stock A of the swage A B, substantially as herein shown and described, and for the purpose set forth.

ANDREW J. McCOLLUM.
GEORGE D. EMERY.

Witnesses for McCOLLUM:
  JAMES T. GRAHAM,
  T. B. MOSHER.
Witnesses for EMERY:
  E. MOSIER,
  J. R. HARDIN.